United States Patent [19]

Shinryo et al.

[11] Patent Number: 4,536,952
[45] Date of Patent: Aug. 27, 1985

[54] PREPARATION OF LAMINATED IRON CORE OF ELECTRIC DEVICE

[75] Inventors: Yuko Shinryo; Takashi Yamamoto, both of Nagasaki, Japan

[73] Assignee: Mitsubishi Denki Kabushiki Kaisha, Tokyo, Japan

[21] Appl. No.: 589,405

[22] Filed: Mar. 16, 1984

Related U.S. Application Data

[63] Continuation of Ser. No. 338,994, Jan. 12, 1982, abandoned.

[30] Foreign Application Priority Data

Jan. 12, 1981 [JP] Japan .................................. 56-563472

[51] Int. Cl.³ ............................................. H02K 15/02
[52] U.S. Cl. ........................................ 29/596; 29/609; 310/42; 310/216
[58] Field of Search .......................... 29/596, 609, 416; 310/42, 216

[56] References Cited

U.S. PATENT DOCUMENTS

| 3,461,758 | 8/1969 | Michiulis | 29/609 X |
| 3,983,621 | 10/1976 | Donahoo | 29/596 |
| 302,001,799 | 5/1935 | Seyfried | 310/217 X |

FOREIGN PATENT DOCUMENTS 1289176  2/1969  Fed. Rep. of Germany ...... 310/216

Primary Examiner—Carl E. Hall
Attorney, Agent, or Firm—Oblon, Fisher, Spivak, McClelland & Maier

[57] ABSTRACT

A laminated iron core of an electric device is prepared by stamping a strip having a width smaller than an outer diameter of the laminated iron core to form iron core discs having one or more straight edges and also to form segmented circular pieces from excess fragments of the strip and processing the iron core discs to form iron core ring plates having straight edges and assembling the iron core ring plates and the segmented circular pieces to form the laminated iron core.

2 Claims, 7 Drawing Figures

4,536,952

PREPARATION OF LAMINATED IRON CORE OF ELECTRIC DEVICE

This application is a continuation, of application Ser. No. 338,994, filed Jan. 12, 1982, now abandoned.

BACKGROUND OF THE INVENTION

1. Field of the Invention

The present invention relates to a method of preparation of a laminated iron core of an electric device and more particularly to a method of preparation more effectively utilizing the material of a strip for iron cores.

2. Description of the Prior Art

A laminated iron core of a rotary electric device is formed by laminating a number of iron core plates obtained by stamping a strip for iron cores in a desired shape.

In the conventional preparation method, as shown in FIG. 1, iron core discs (11), having an outer diameter R ($<W_1$) the same as the outer diameter of a stator laminated iron core, are obtained by stamping the strip for iron cores (1) having a width $W_1$ at a desired stamping gap d and forming a shaft hole (11a) at the center of each iron core disc (11) in an annular form and further stamping the iron core discs (11) to form rotor or stator slots (not shown) so as to separate them into smaller diameter ring plate and larger diameter ring plate. The smaller diameter ring plates and the larger diameter ring plates are respectively laminated to prepare a rotor laminated iron core (100) and a stator laminated iron core (200) as shown in FIG. 3.

In FIG. 2, iron core discs (21) are obtained by stamping a strip for iron cores (2) having a width $W_2$ ($=k$) being smaller than the outer diameter R of the stator laminated iron core and each shaft hole (21a) and the slots (not shown) are formed by the same manner as described hereinabove.

In accordance with the conventional preparation of iron core ring plates for the stator and rotor laminated iron cores by stamping iron core discs obtained by stamping a strip for iron cores in the outer diameter of the stator laminated iron core, excess fragments (12), (22) of the strip for iron cores formed between the stamped iron core discs are wasted without a reuse and accordingly, the efficiency for utilization of the strip for iron cores is disadvantageously inferior.

SUMMARY OF THE INVENTION

An object of the present invention is to provide a method of preparation of laminated iron cores which overcomes the aforementioned disadvantages of the conventional preparation method.

Another object of the present invention is to provide a method of preparation of a laminated iron core of an electric device with remarkably higher efficiency for utilization of the strip of iron cores in comparison with that of the conventional preparation.

The foregoing and other objects of the present invention have been attained by stamping a strip having a smaller width than an outer diameter of the iron core to form iron core discs having one or more straight edges and also to form segmented circular pieces from the excess fragments of the strip, and assembling iron core ring plates obtained from iron core discs and the segmented circular pieces to form the laminated iron core.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

DETAILED DESCRIPTION OF THE PREFERRED EMBODIMENTS

Figure 1:
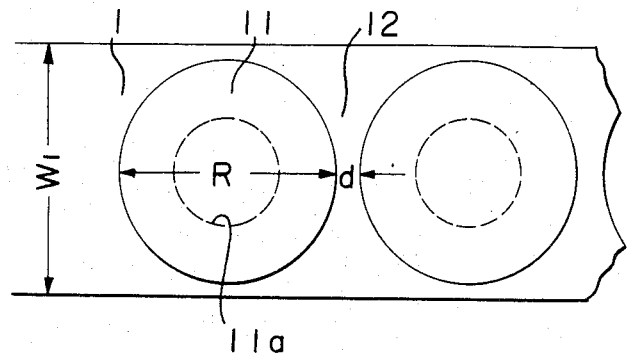
FIGS. 1 and 2 are respectively schematic views illustrating the conventional preparation of a laminated iron core.
Figure 4:
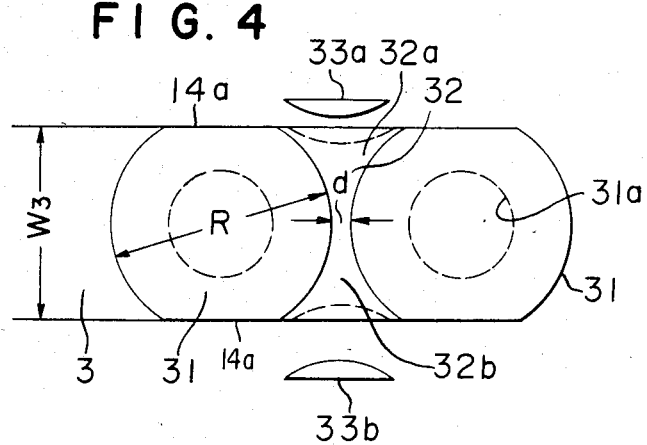
FIGS. 4 and 5 are respectively schematic views for illustrating one embodiment of the method of preparation and assembly of a laminated iron core according to the present invention.

In the first embodiment of the present invention, a strip for iron cores (3) having a width $W_3$ ($<R$) as shown in FIG. 4 is used in the stamping of the strip to form iron core discs (31) for laminated iron cores of a rotary electric device which include a stator laminated iron core having an outer diameter R. The strip for iron cores (3) is stamped to form the iron core discs (31) having a modified peripheral shape having a pair of straight edges 14a in both sides (which is different from the complete shape of the stator laminated iron core) with each stamping gap d being the same as the conventional stamping gap as shown in FIG. 1. That is, the strip 3 is stamped to form the iron core discs (31) having a first pair of straight edges 14a at the position of $\frac{1}{2} W_3$ from the center of the circular disc having a diameter R in symmetrical to the center line. At the same time as the stamping of the iron core discs (31) or after the stamping, segmented circular pieces (33a), (33b) are obtained by stamping the excess fragments (32) of the strip for iron cores (3) which are formed by the stamping of the iron cores discs (31). The segmented circular (33a), (33b) are formed by stamping as shown by the dotted lines so as to include the side edge of the strip (31) of each of side parts (32a), (32b) of the excess fragment (32) in the shape of ▢ an equilateral hyperbola truncated by parallel lines, as the straight edge of the segmented circular pieces (33a), (33b).

Figure 5:
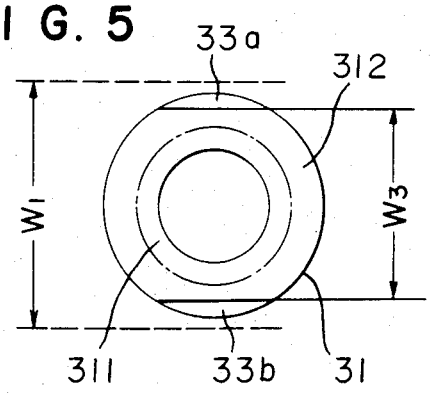

Each shaft hole (31a) shown in FIG. 4 is formed by stamping each iron core disc (31) by the conventional manner and then, rotor slots and stator slots (not shown) are formed by stamping the iron core disc (31) to separate it into a rotor iron core ring plate (311) having a smaller diameter and a stator iron core ring plate (312) having a larger diameter. The stator iron core ring plates (312) and the segmented circular pieces (33a), (33b) are assembled by lamination. The assembly is shown in FIG. 5. The segmented circular pieces (33a), (33b) are fixed by fastening force after insertion into the laminated layers of stator iron core ring plate 312 without a bonding.

Figure 6:
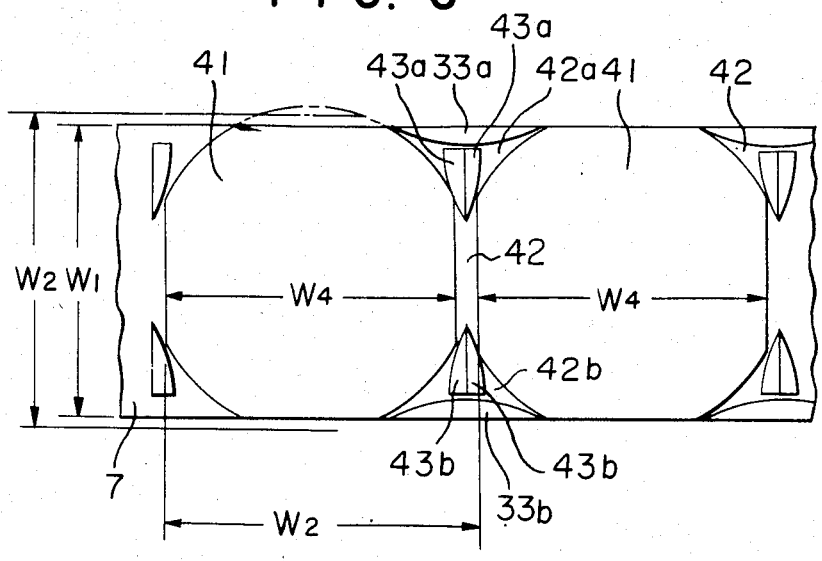
FIGS. 6 and 7 are respectively schematic views for illustrating the other embodiment of the method of preparation and assembly of a laminated iron core according to the present invention.

FIG. 6 shows the other embodiment of the present invention. In this embodiment, a strip 7 is stamped to form iron core discs (41) having two pairs of straight edges (two additional straight edges are further formed on the iron core disc (31) shown in FIG. 4 at the adjacent sides) and both sides parts (42a) (42b) and first portion (42) of the excess fragments are stamped to form half segmented circular pieces (43a), (43a), (43b), (43b).

Figure 7:
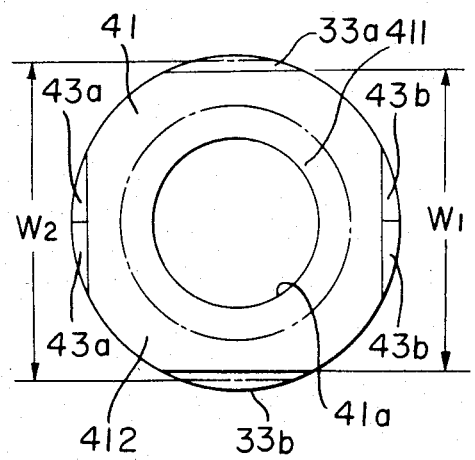

Each shaft hole (41a) shown in FIG. 7 is formed on each iron core disc (41) and rotor slots and stator slots (not shown) are formed by stamping to separate it into a rotor iron core ring plate (411) and a stator iron core ring plate (412). The stator iron core ring plate (412) and the segmented circular pieces (33a), (33b), (43a), (43a), (43b), (43b) are assembled by lamination in the manner described hereinabove. The assembly is shown in FIG. 7.

Figure 2:
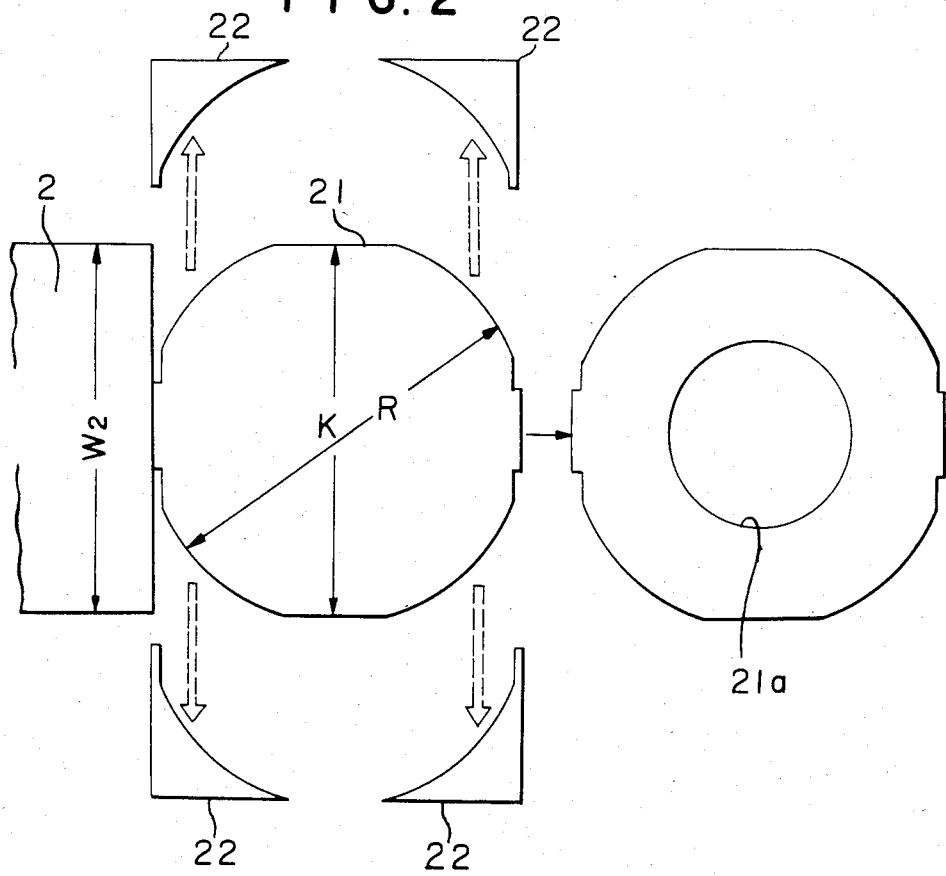
Figure 3:
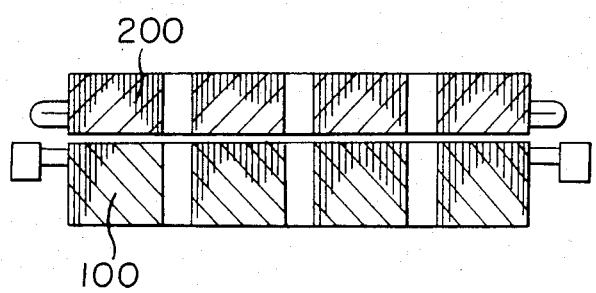
FIG. 3 is a sectional view of laminated iron cores of a rotary electric device.

In this embodiment, the width W4 of the iron core disc (41) (in the longitudinal direction) in the stamping to form the iron core disc (41) can be smaller than that of the iron core disc (11), (12) shown in FIGS. 1 and 2 and that of the iron core disc (31) shown in FIG. 4. The half-segmented circular pieces (43a), (43a), (43b), (43b) can be obtained by stamping the side parts (42a), (42b) of the excess fragment (42) such that each pair of half segmented circular pieces (43a), (43a) or (43b), (43b) have a common straight edge. Therefore, the efficiency for utilization of the strip for iron cores 7 is further improved.

In accordance with the present invention, a strip having a smaller width can be used and excess fragments wasted in the conventional stamping process can be utilized to improve the efficiency for utilization of the strip for iron cores and the cost for preparation of laminated iron cores can be remarkably reduced in comparison with the conventional preparation and a laminated iron core having an outer diameter larger than the width of the strip for iron cores can be obtained.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of preparation of a circular laminated iron core of an electric device, said method comprising the steps of:
    stamping a strip having a width smaller than an outer diameter of said laminated iron core;
    stamping iron core discs and excess from said strip, each of said discs having four straight edges, adjacent straight edges of adjacent ones of said discs being separated by first portions of said excess;
    stamping segmented circular pieces from said excess, and stamping half segmented circular pieces from portions of said excess including said first portions of said excess;
    processing said iron core discs to form iron core ring plates having four straight edges;
    assembling said half segmented circular pieces to form additional segmented circular pieces; and
    attaching said segmented circular pieces to said straight edges to form said circular laminated iron core plate.

2. The method of preparation of a laminated iron core according to claim 1 wherein said iron core ring plate is processed by stamping said iron core disc to form slots.

* * * * *